Sept. 1, 1959     A. L. SHERER ET AL     2,902,044
VALVE
Filed July 17, 1956

INVENTOR.
ALBERT L. SHERER
JULIUS J. KAZMIERZAK
BY
*M. A. Hobbs*
ATTORNEY

United States Patent Office 2,902,044
Patented Sept. 1, 1959

2,902,044

VALVE

Albert L. Sherer, Niles, Mich., and Julius J. Kazmierzak, South Bend, Ind., assignors to Summit Manufacturing Co., a Division of Ace Tool Engineering Co., Inc., South Bend, Ind., a corporation of Indiana Application July 17, 1956, Serial No. 598,301

3 Claims. (Cl. 137—199)

The present invention relates to a valve and more particularly to an automatic air bleed valve.

One of the principal objects of the present invention is to provide a valve for automatically bleeding air from a hydraulic system, which can be employed in a variety of different types of systems and under various conditions without modifying the construction and operation of the valve.

Another object of the present invention is to provide a relatively easily fabricated valve for bleeding air from hydraulic systems and the like which can be assembled and installed in the system without the use of any special tools or equipmnet.

Still another object is to provide a valve of the aforesaid type wherein the movable valve element readily seats and forms a fluid-tight seal when hydraulic fluid replaces the air therein and maintains said fluid-tight seal until the fluid is withdrawn from the valve.

Another object is to provide a relatively simple, trouble-free valve for a hydraulic system which requires little or no attention throughout extended operation of said system.

A further object of the invention is to provide a valve having a free moving element adapted to move automatically to closed position under the influence of hydraulic fluid or other liquid therein after the air is completely eliminated, and to adapt itself to the valve seat to form an effective seal.

Figure 1:
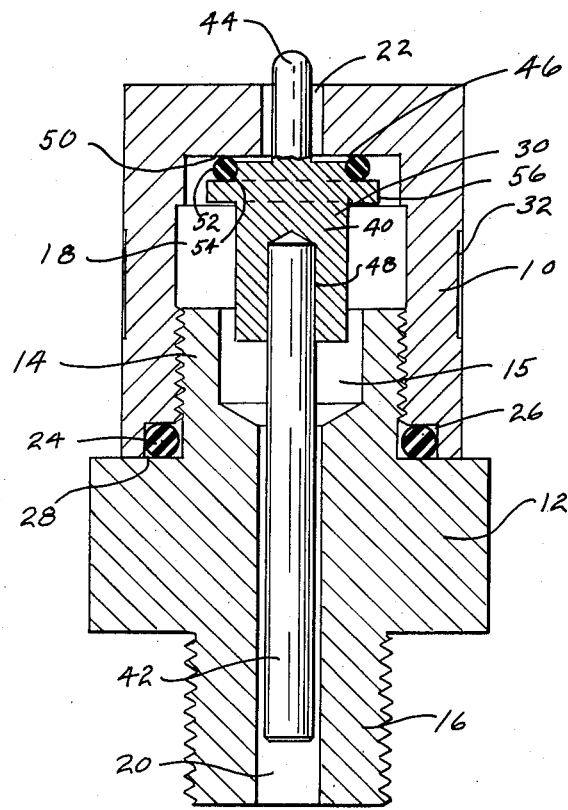
Figure 2:
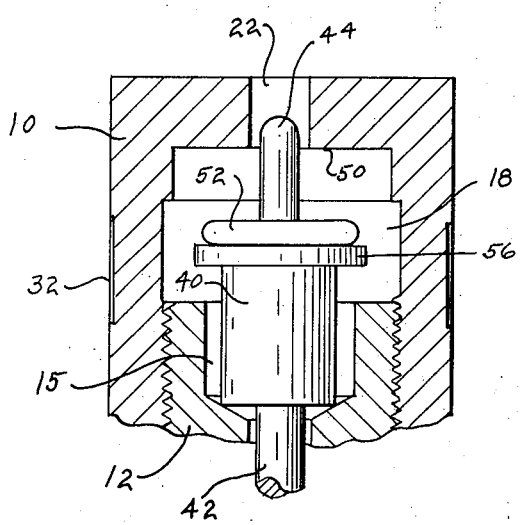

Additional objects and advantages will be apparent from the following description and accompanying drawing, wherein Figure 1 is a vertical cross-sectional view of one embodiment of our valve, showing said valve in its closed position; and Figure 2 is a fragmentary cross-sectional view of the valve of Figure 1 showing the valve in its opened position.

The valve shown in the drawing includes a cylindrical hollow body portion 10 and a cylindrical sleeve portion 12 having an extension 14 threaded into the interior of the body portion and containing a recess 15. Sleeve portion 12 is connected into a hydraulic system or the like from which the air is bled, by a threaded end section 16. A valve chamber 18 is formed in the body portion at the end of extension 14 and is connected to a passage or conduit of the hydraulic system by passage 20 in sleeve portion 12 and to the atmosphere or a vent connection by port 22 in the upper end of body portion 10. An effective seal is formed between body portion 10 and sleeve portion 12 by an O-ring 24 seated in annular groove 26 in the base of body portion 10, said O-ring engaging the sides of the groove and shoulder 28 of the sleeve to form a fluid-tight seal on those surfaces when the sleeve portion is threaded into and tightened in the body portion. Since it is sometimes necessary to remove the body portion from the sleeve portion to clean small particles of grit and other foreign matter from the movable valve element 30 and the valve seat, an annular knurled portion 32 is preferably provided on the surface of the body portion to serve as a hand grip to assist in unscrewing and tightening the body portion.

The movable valve element 30 consists of a body 40 having two coaxial stems 42 and 44 and a valve seat engaging portion 46. Stem 42 is inserted in a recess 48 of body 40 and is secured therein by brazing, welding or the like so that it forms an integral part of the valve element and when assembled in the valve extends through a sub-portion of passage 20 to serve primarily as a guide for the seating of the valve element on seat 50. Stem 44 shown as formed integrally with the top end of body 40 is adapted to extend into and through port 22 and to form a means by which the operator of the machine on which the valve is installed can check the valve element to determine whether it is in proper working condition.

The valve seat engaging portion 46 consists of a resilient gasket 52, such as an O-ring seated in an annular groove 54 and against the upper surface of shoulder 56 of body 40. The gasket 52 seats on a flat surfaced valve seat 50 and, since the entire valve element 30 in effect floats in the valve chamber, it permits the gasket to adapt itself to the valve seat surface. With the resilient O-ring gasket construction and floating valve element, close tolerances between portion 46 and seat 50 are unnecessary and an effective seal will be obtained despite minor irregularities in the sealing surfaces or the presence of small particles of foreign matter on or between said surfaces.

In the operation of the valve structure just described, when a hydraulic system containing air is started, valve element 30 is in its opened position, as shown in Figure 2, resting on the bottom of recess 15. Air forced through the system in front of or above the hydraulic fluid as the latter fills the system, lifts element 30 sufficiently to permit it to enter chamber 18 and flow therethrough and out through port 22. The air in lifting the element does not lift it sufficiently to close the valve or interfere with the free escape of the air from the chamber through port 22. After all the air has been ejected or bled from the system through the valve, the hydraulic fluid enters passage 20 and chamber 18 and due to its specific gravity and viscosity lifts valve element 30 and seats gasket 52 on valve seat 50. Once the valve is closed the relatively large differential in pressure between the hydraulic fluid beneath the element and atmospheric pressure in port 22 holds gasket 52 firmly against seat 50 in a fluid-tight relationship. When the hydraulic fluid is drained from the system and the pressure is relieved in the valve, element 30 drops downwardly, opening the valve.

Various changes can be made in the valve structure shown and described herein without departing from the scope of the present invention.

We claim:

1. An air bleed valve for a hydraulic system or the like, comprising a body having a cylindrical chamber therein and a port connecting one end of said chamber with the atmosphere, a sleeve threaded into said body closing the other end of said chamber and having a fluid passage therethrough, a substantially flat valve seat around said port on the end wall of said chamber, a freely movable, elongated cylindrical element openable by gravity in said chamber having a stem extending into and through said port and spaced from the body defining said port, and a second stem of greater length and diameter than said first stem coaxially arranged with said first stem extending into said passage and spaced from the walls thereof, the space between said second stem and said passage being of a size such that air will flow freely therethrough while hydraulic fluid on entering said space will lift said element to closed position and the space between said first stem and port being larger than the space between said second stem and passage, an annular shoulder on the periphery of said element in the proximity of but spaced from the end of said element facing said valve seat, and an O-ring gasket disposed around said element and resting on said shoulder for engaging said valve seat.

2. An air bleed valve, comprising a body having a chamber therein and a port in one end for venting said chamber, a sleeve threaded into said body forming the other end of said chamber and having a fluid inlet passage for said chamber, a substantially flat valve seat around said port on the wall of said chamber, a freely movable valve element openable by gravity in said chamber having a stem extending into said port and a second stem of greater length and diameter than said first stem coaxially arranged with said first stem extending into said passage, said stems being spaced from the walls defining the respective port and passage, the space between said second stem and said passage being of a size such that air will flow freely therethrough while hydraulic fluid on entering said space will lift said element to closed position and the space between said first stem and port being larger than the space between said second stem and passage, and a sealing means on said element including an O-ring gasket for engaging said valve seat.

3. A bleed valve, comprising a body having a chamber therein and a port for venting said chamber, a fluid inlet passage for said chamber, a substantially flat valve seat around said port on the wall of said chamber, a loosely fitting, freely movable valve element openable by gravity in said chamber having a stem extending into said port and a second stem of greater length and width than said first stem coaxially arranged with said first stem extending into said passage, the space between said second stem and said passage being of a size such that air will flow freely therethrough while hydraulic fluid on entering said space will lift said element to closed position and the space between said first stem and port being larger than the space between said second stem and passage, and a sealing means on said element including an O-ring gasket for engaging said valve seat.

References Cited in the file of this patent

UNITED STATES PATENTS

| | | |
|---|---|---|
| 213,033 | Bingham | Mar. 11, 1879 |
| 442,529 | Merrill | Dec. 9, 1890 |
| 512,518 | Palmer | Jan. 9, 1894 |
| 1,566,580 | Cook | Dec. 22, 1925 |
| 1,576,331 | Kelley | Mar. 9, 1926 |
| 2,745,628 | Carlson | May 15, 1956 |
| 2,853,094 | Wexler | Sept. 23, 1958 |

FOREIGN PATENTS

| | | |
|---|---|---|
| 74,465 | Denmark | of 1952 |